US012480643B2

(12) United States Patent
Feit et al.

(10) Patent No.: US 12,480,643 B2
(45) **Date of Patent: *Nov. 25, 2025**

(54) TWIST AND LOCK MOUNTING BRACKET

(71) Applicant: Feit Electric Company, Inc., Pico Rivera, CA (US)

(72) Inventors: Alan Barry Feit, Encino, CA (US); Brian Halliwell, Pico Rivera, CA (US)

(73) Assignee: Feit Electric Company, Inc., Pico Rivera, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/295,510

(22) Filed: Apr. 4, 2023

(65) Prior Publication Data

US 2023/0243488 A1 Aug. 3, 2023

Related U.S. Application Data

(63) Continuation of application No. 17/563,308, filed on Dec. 28, 2021, now Pat. No. 11,644,185, which is a (Continued)

(51) Int. Cl.

*F21V 21/04* (2006.01)
*F21S 8/00* (2006.01)

(Continued)

(52) U.S. Cl.

CPC ................ *F21V 21/04* (2013.01); *F21S 8/02* (2013.01); *F21S 8/036* (2013.01); *F21S 8/043* (2013.01);

(Continued)

(58) Field of Classification Search

CPC .... F21S 8/026; F21S 8/036; F21S 8/02; F21S 8/043

See application file for complete search history.

(56) References Cited

U.S. PATENT DOCUMENTS 3,130,949 A * 4/1964 Wolff ...................... F21S 8/026 362/365
5,165,788 A * 11/1992 Mclaughlin ............ F21V 29/83 362/310

(Continued)

OTHER PUBLICATIONS

U.S. Appl. No. 17/563,308, filed Dec. 28, 2021, U.S. Pat. No. 11,644,185, Issued.

(Continued)

*Primary Examiner* — Zheng Song
(74) *Attorney, Agent, or Firm* — Alston & Bird LLP

(57) ABSTRACT

A twist-and-lock mounting bracket may secure a lighting fixture to a mounting surface. The twist-and-lock mounting bracket may define an aperture having features corresponding to the shape of a twist-and-lock element disposed on a housing of a lighting fixture. Accordingly, the twist-and-lock element may be configured to extend through the aperture while the corresponding features of the twist-and-lock element and the aperture are aligned. The housing may then be rotated such that the tabs do not align with the corresponding features of the aperture, and the twist-and-lock element is thereby prevented from sliding through the aperture. The mounting bracket may be secured to a junction box positioned within a mounting surface, or it may be secured to a biasing bracket having one or more second resilient members configured to engage the interior of a recessed can light, such that the lighting fixture may be secured to the recessed can light.

19 Claims, 12 Drawing Sheets

Related U.S. Application Data continuation of application No. 17/071,573, filed on Oct. 15, 2020, now Pat. No. 11,236,890, which is a continuation of application No. 16/909,441, filed on Jun. 23, 2020, now Pat. No. 10,845,038, which is a continuation of application No. 16/545,883, filed on Aug. 20, 2019, now Pat. No. 10,731,830, which is a continuation of application No. 15/994,677, filed on May 31, 2018, now Pat. No. 10,429,042, which is a continuation of application No. 15/495,257, filed on Apr. 24, 2017, now Pat. No. 10,012,365, which is a continuation of application No. 14/720,334, filed on May 22, 2015, now Pat. No. 9,657,925.

(60) Provisional application No. 62/066,183, filed on Oct. 20, 2014, provisional application No. 62/002,085, filed on May 22, 2014.

(51) Int. Cl.

| | |
|---|---|
| ***F21S 8/02*** | (2006.01) |
| ***F21S 8/04*** | (2006.01) |
| *F21Y 115/10* | (2016.01) |

(52) U.S. Cl.

CPC ............ *F21S 8/026* (2013.01); *F21Y 2115/10* (2016.08); *Y10T 29/49119* (2015.01)

(56) References Cited

U.S. PATENT DOCUMENTS

| | | | | |
|---|---|---|---|---|
| 5,934,788 | A * | 8/1999 | Wolfe | F21V 21/04 362/427 |
| 7,909,487 | B1 | 3/2011 | Venetucci et al. | |
| 9,657,925 | B2 | 5/2017 | Feit et al. | |
| 9,702,533 | B1 * | 7/2017 | Harpenau | F21V 21/03 |
| 10,012,365 | B2 | 7/2018 | Feit et al. | |
| 10,429,042 | B2 | 10/2019 | Feit et al. | |
| 10,731,830 | B2 | 8/2020 | Feit et al. | |
| 10,845,038 | B2 | 11/2020 | Feit et al. | |
| 11,221,128 | B1 * | 1/2022 | Winters | F21V 17/06 |
| 11,236,890 | B2 | 2/2022 | Feit et al. | |
| 11,644,185 | B2 | 5/2023 | Feit et al. | |
| 2012/0266449 | A1 * | 10/2012 | Krupa | F21V 19/00 29/592.1 |
| 2013/0120992 | A1 | 5/2013 | Deurenberg et al. | |
| 2013/0208489 | A1 | 8/2013 | Schmuckle | |
| 2014/0160772 | A1 * | 6/2014 | Wu | F21V 17/002 362/373 |
| 2014/0355274 | A1 * | 12/2014 | Santiago | F21S 8/02 362/374 |
| 2015/0233556 | A1 * | 8/2015 | Danesh | F21V 21/048 362/365 |
| 2015/0338071 | A1 | 11/2015 | Feit et al. | |
| 2016/0145041 | A1 | 5/2016 | Fritch | |
| 2016/0363297 | A1 | 12/2016 | Boulanger et al. | |
| 2017/0167672 | A1 * | 6/2017 | Stauner | F21V 21/04 |
| 2017/0227195 | A1 | 8/2017 | Feit et al. | |
| 2017/0277195 | A1 | 9/2017 | Frazzoli et al. | |
| 2018/0274762 | A1 | 9/2018 | Feit et al. | |
| 2019/0368698 | A1 | 12/2019 | Feit et al. | |
| 2020/0318816 | A1 | 10/2020 | Feit et al. | |
| 2021/0025573 | A1 | 1/2021 | Feit et al. | |
| 2022/0120416 | A1 | 4/2022 | Feit et al. | |

OTHER PUBLICATIONS

U.S. Appl. No. 17/071,573, filed Oct. 15, 2020, U.S. Pat. No. 11,236,890, Issued.

U.S. Appl. No. 16/909,441, filed Jun. 23, 2020, U.S. Pat. No. 10,845,038, Issued.

U.S. Appl. No. 16/545,883, filed Aug. 20, 2019, U.S. Pat. No. 10,731,830, Issued.

U.S. Appl. No. 15/994,677, filed May 31, 2018, U.S. Pat. No. 10,429,042, Issued.

U.S. Appl. No. 15/495,257, filed Apr. 24, 2017, U.S. Pat. No. 10,012,365, Issued.

U.S. Appl. No. 14/720,334, filed May 22, 2015, U.S. Pat. No. 9,657,925, Issued.

* cited by examiner

TWIST AND LOCK MOUNTING BRACKET

CROSS REFERENCE TO RELATED APPLICATIONS

This patent application is a continuation of U.S. patent application Ser. No. 17/563,308, filed Dec. 28, 2021, which is a continuation of U.S. patent application Ser. No. 17/071,573, filed Oct. 15, 2020 (now U.S. Pat. No. 11,236,890, granted Feb. 1, 2022), which application is itself a continuation of U.S. patent application Ser. No. 16/909,441, filed Jun. 23, 2020 (now U.S. Pat. No. 10,845,038, granted Nov. 24, 2020), which application is itself a continuation of U.S. patent application Ser. No. 16/545,883, filed Aug. 20, 2019 (now U.S. Pat. No. 10,731,830, granted Aug. 4, 2020), which application is itself a continuation of U.S. patent application Ser. No. 15/994,677, filed May 31, 2018 (now U.S. Pat. No. 10,429,042, granted Oct. 1, 2019), which application is itself a continuation of U.S. patent application Ser. No. 15/495,257, filed on Apr. 24, 2017 (now U.S. Pat. No. 10,012,365, granted Jul. 3, 2018), which application is itself a continuation of U.S. patent application Ser. No. 14/720,334, filed on May 22, 2015 (now U.S. Pat. No. 9,657,925, granted May 23, 2017), which application further claims priority to U.S. Provisional Application Ser. No. 62/002,085, filed May 22, 2014 and U.S. Provisional Application Ser. No. 62/066,183, filed Oct. 20, 2014; the contents of all of which as are hereby incorporated herein by reference in their entirety.

BACKGROUND

Progress in the field of engineering and manufacturing light emitting diodes (LEDs) has resulted in an increased interest in employing LED lamps in general lighting applications. Particularly, an interest exists in developing LED technology to provide energy efficient and aesthetically pleasing lighting solutions. In various situations, the developing LED technology has led to new sets of safety regulations (Underwriters Laboratory certification, etc.).

BRIEF SUMMARY

Various embodiments of the present invention are directed to a light fixture comprising a housing defining an emission side and a mounting side. The housing may comprise at least one lighting element (e.g., a Light Emitting Diode) configured to emit light through the emission side of the housing. The light fixture may additionally comprise a twist-and-lock element disposed on the mounting side of the housing, and a mounting bracket comprising a twist-and-lock receptacle; wherein the twist-and-lock element is configured to engage the twist-and-lock receptacle such that the housing is detachably secured to the mounting bracket. In various embodiments, the twist-and-lock element may comprise a central body element extending away from the mounting side of the housing and one or more tabs extending laterally away from the central body; and the twist-and-lock receptacle of the mounting bracket may be defined as an aperture having features corresponding to the central body element and the one or more tabs. In such embodiments, the central body element and the one or more tabs are configured to extend through the aperture such that the housing is permitted to twist relative to the mounting bracket to a locked position in which the one or more tabs are not permitted to slide through the aperture.

Moreover, in various embodiments, the mounting bracket is configured to engage a junction box secured within a mounting surface such that the housing is detachably secured to the mounting surface. In such embodiments, the mounting bracket may comprise one or more standoffs configured to secure the mounting bracket at a minimum distance away from the mounting surface.

Various embodiments of the lighting fixture may additionally comprise a biasing bracket comprising one or more first resilient members biased to an extended position and configured to engage an interior surface of a can light. In such embodiments, the mounting bracket may be configured to engage the biasing bracket such that the housing is detachably secured to the biasing bracket. Moreover, the biasing bracket may additionally comprise one or more width adjustment members securing the first resilient members to the biasing bracket. The width adjustment members may be configurable between a narrow configuration and a wide configuration. In the narrow configuration the first resilient members may be configured to engage the interior surface of a can light having a first diameter, and in the wide configuration the first resilient members may be configured to engage the interior surface of a can light having a second diameter. Moreover, in various embodiments, the one or more width adjustment members may be removable, and the biasing bracket may comprise one or more second resilient members. In such configurations, the one or more second resilient members may be configured to engage the interior surface of a can light having a third diameter when the one or more width adjustment members are removed. The third diameter may be smaller than the first diameter and the second diameter.

Various embodiments of the present invention are directed to a method for installing a lighting fixture comprising the steps of: securing a biasing bracket to a mounting bracket, wherein the biasing bracket comprises one or more first resilient members configured to engage an interior surface of a can light and the biasing bracket comprises a twist-and-lock receptacle configured to engage a twist-and-lock element of a housing; engaging the twist-and-lock element and the twist-and-lock receptacle such that the housing is detachably secured to the mounting bracket and the biasing bracket, wherein the housing comprises at least one lighting element secured therein; electrically connecting the lighting element to an electrical input; securing the one or more first resilient members with an interior surface of a can light such that the lighting fixture is secured with the can light. Various embodiments may additionally comprise steps for sliding one or more width adjusting members securing the first resilient members to the biasing bracket to a position corresponding to the diameter of the can light.

Yet other embodiments of the present invention are directed to a method for installing a lighting fixture comprising the steps of: securing a mounting bracket to a junction box, wherein the junction box is secured within a mounting surface, and wherein the mounting bracket comprises a twist-and-lock receptacle configured to engage a twist-and-lock element of a housing; electrically connecting a lighting element secured within a housing to an electrical input; and engaging the twist-and-lock element and the twist-and-lock receptacle such that the housing is detachably secured to the mounting bracket and the mounting surface.

BRIEF DESCRIPTION OF THE SEVERAL VIEWS OF THE DRAWINGS

Figure 1:
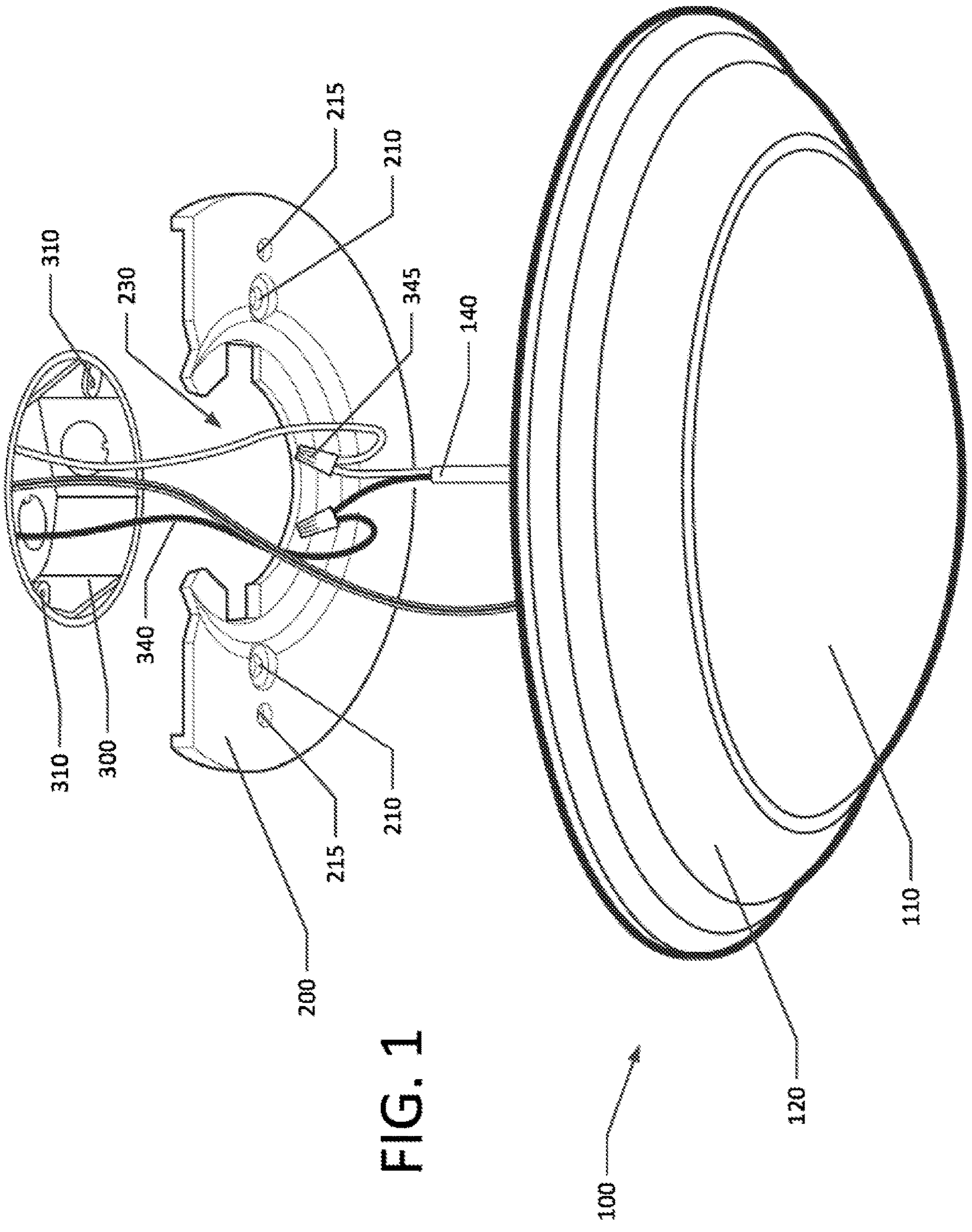
Figure 2:
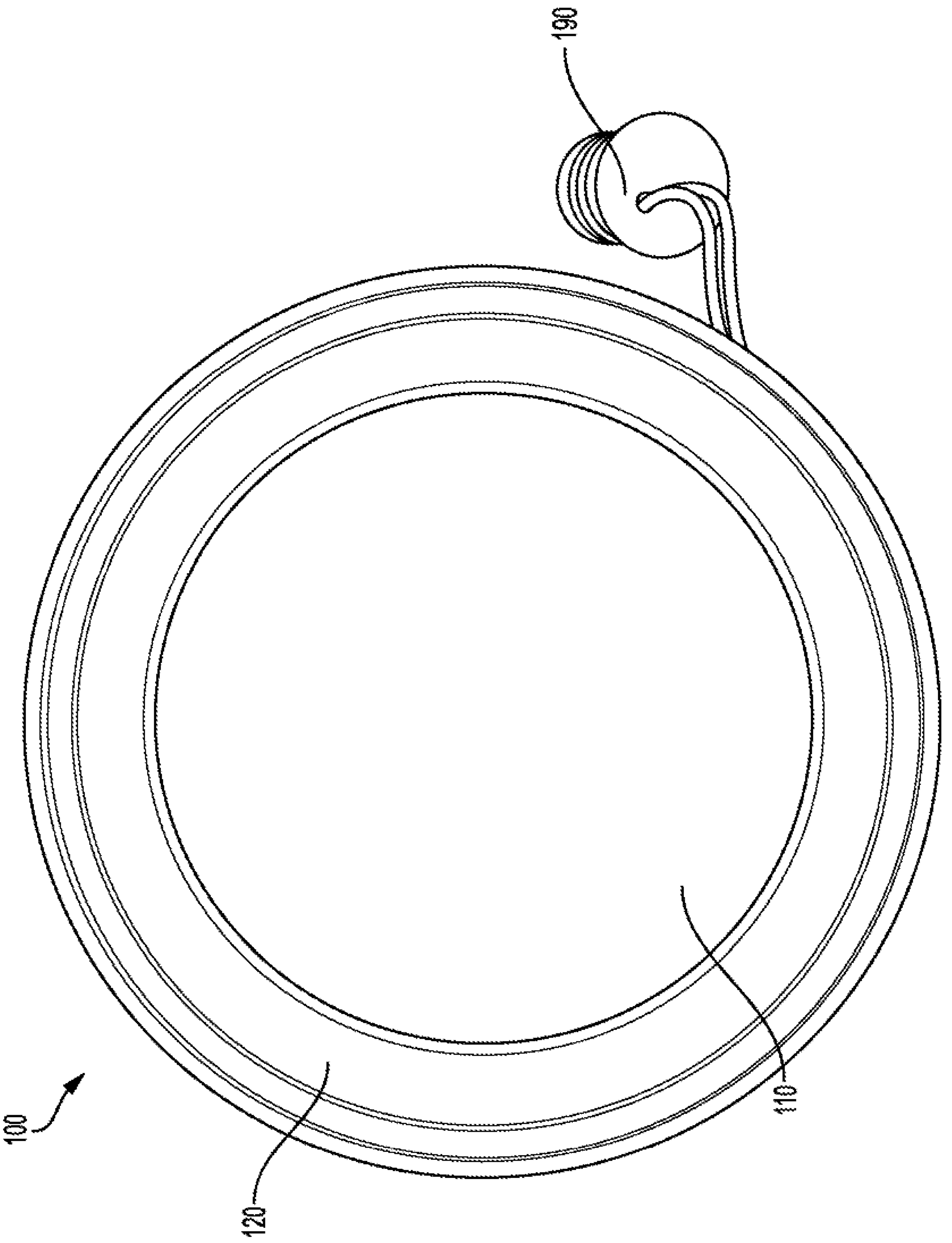
Figure 3:
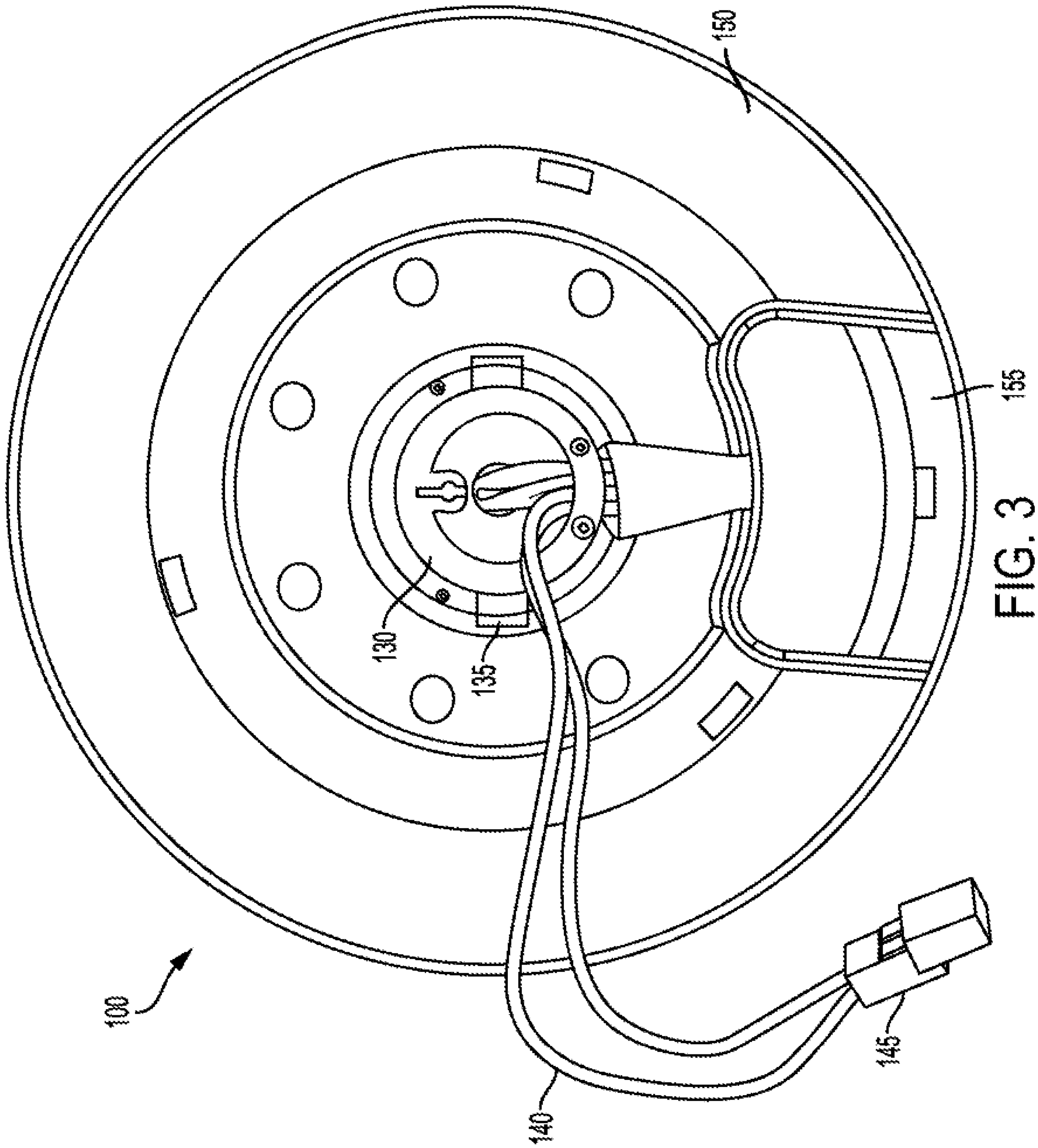
Figure 4B:
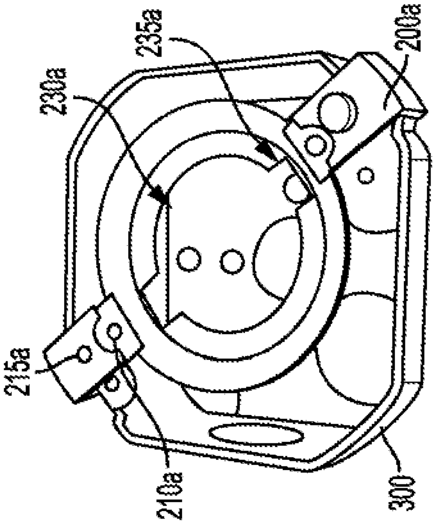
Figure 4A:
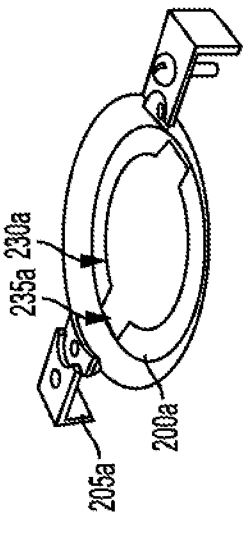
Figure 5A:
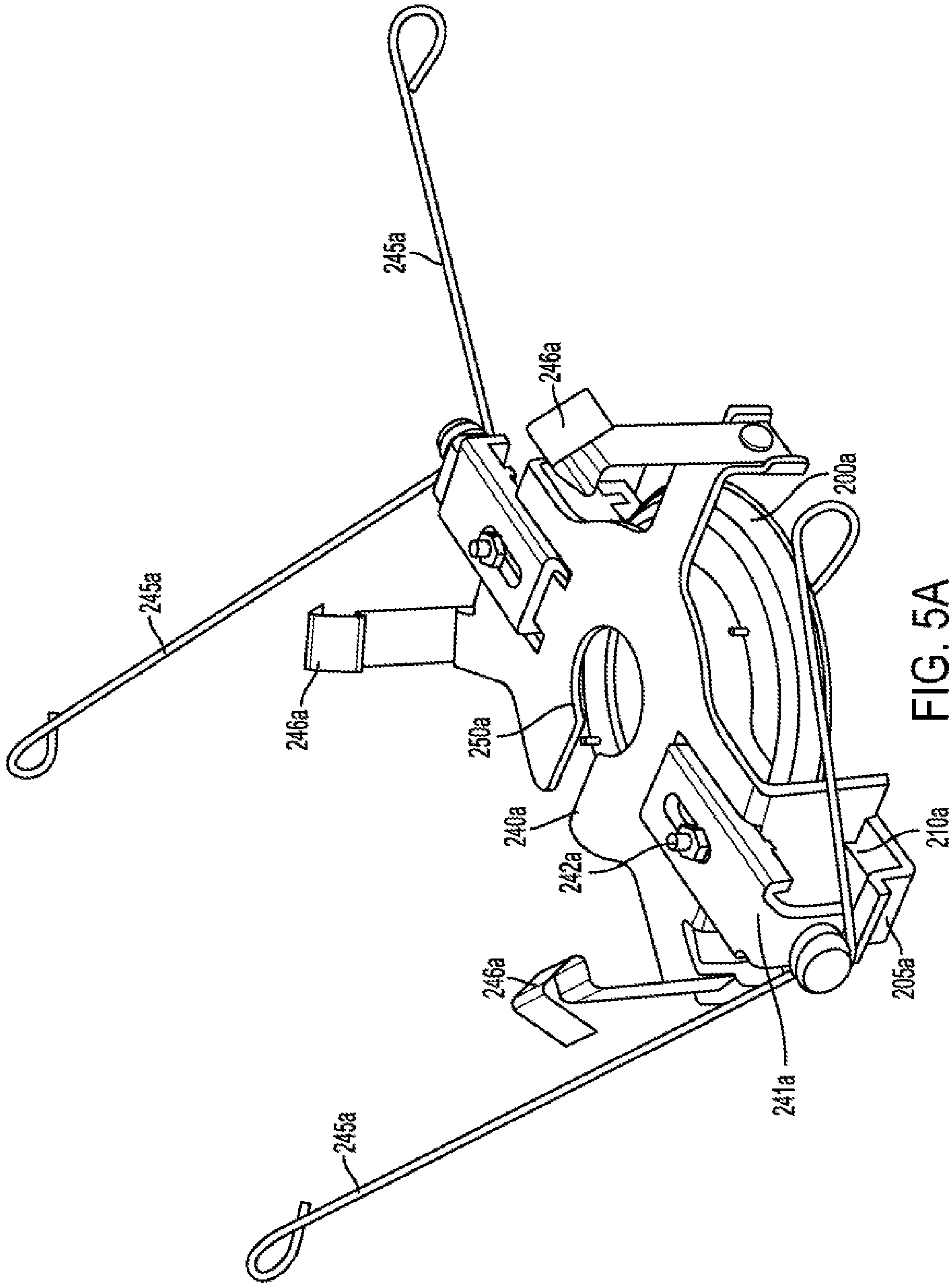
Figure 5B:
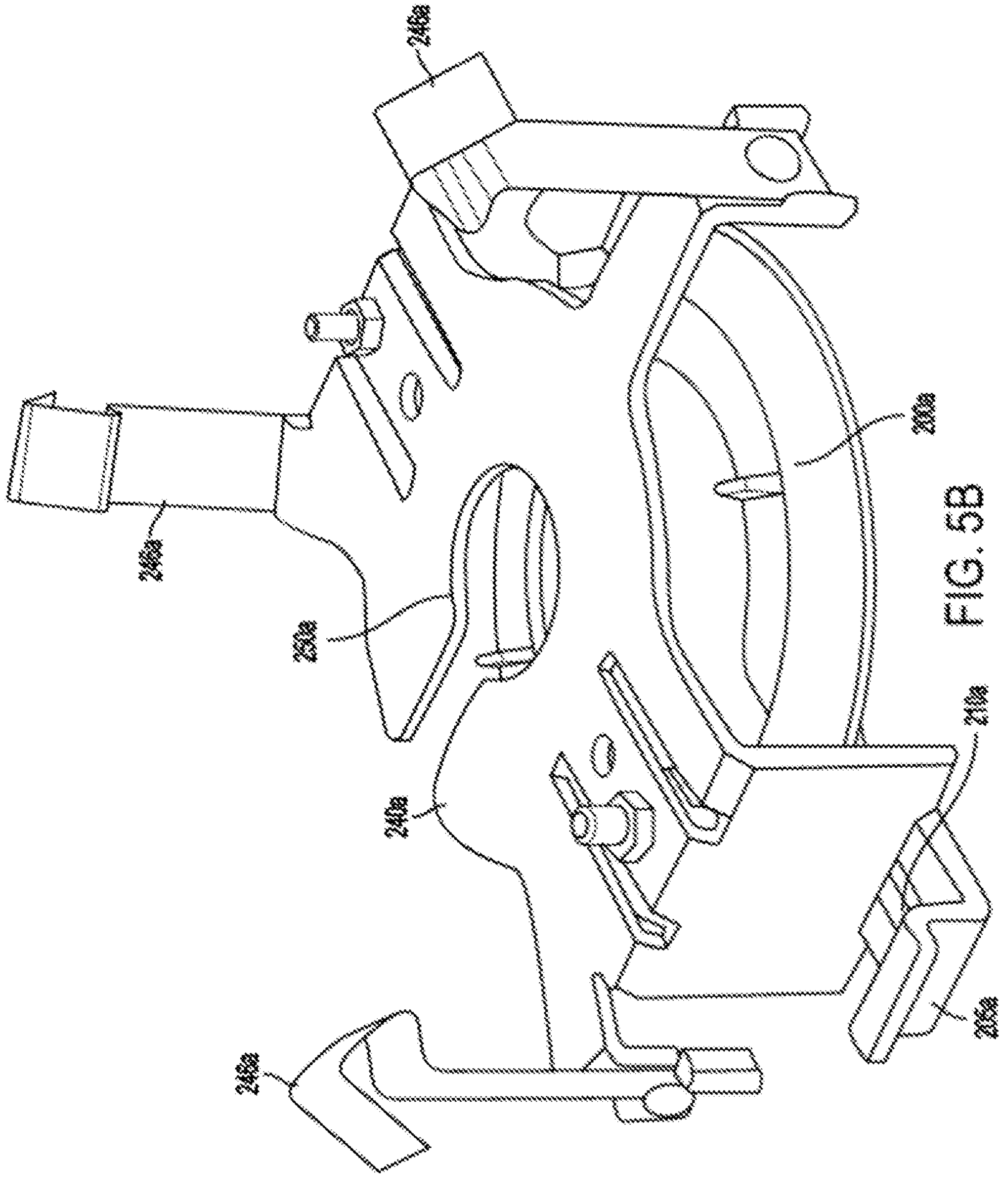
Figure 6:
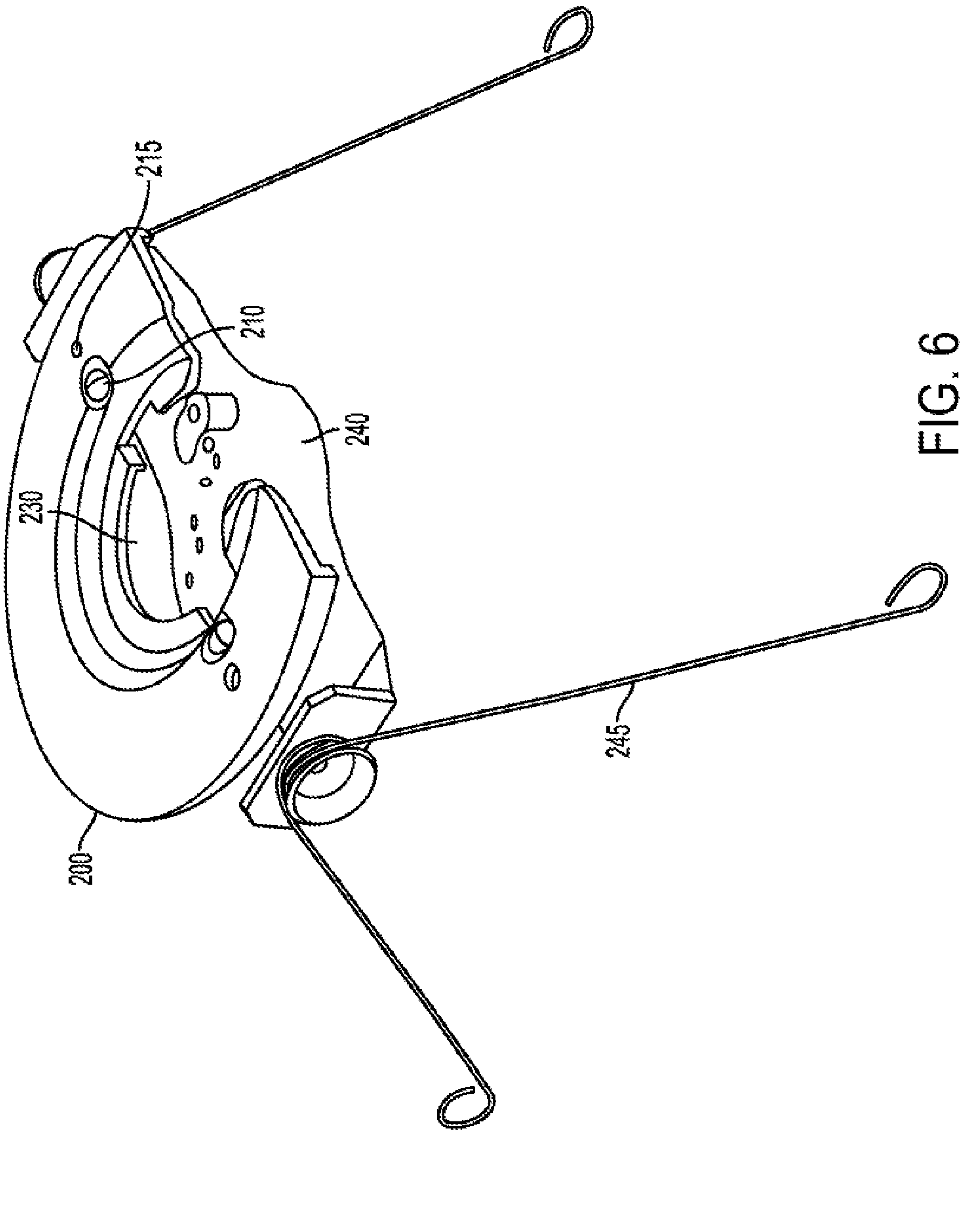
Figure 7:
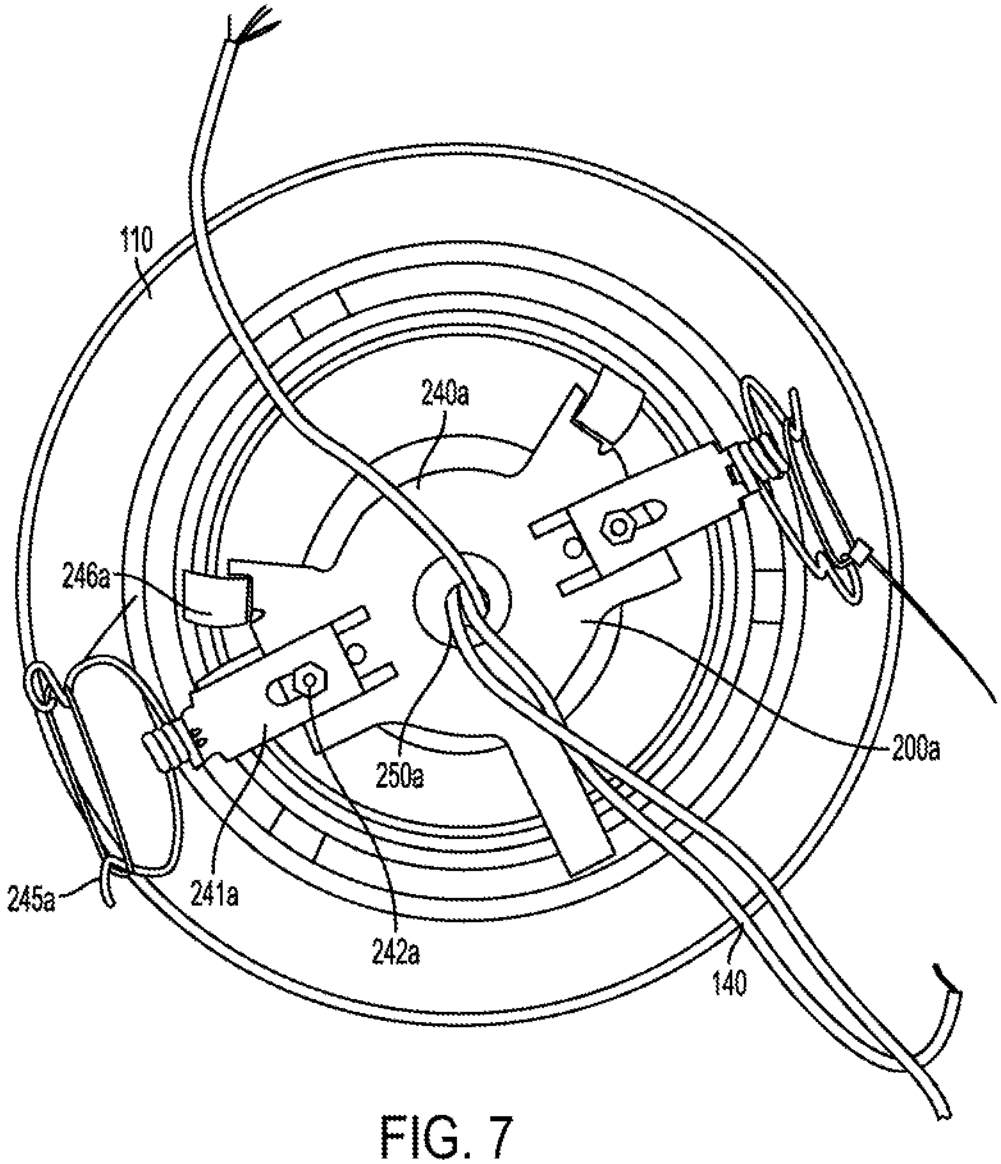
Figure 8:
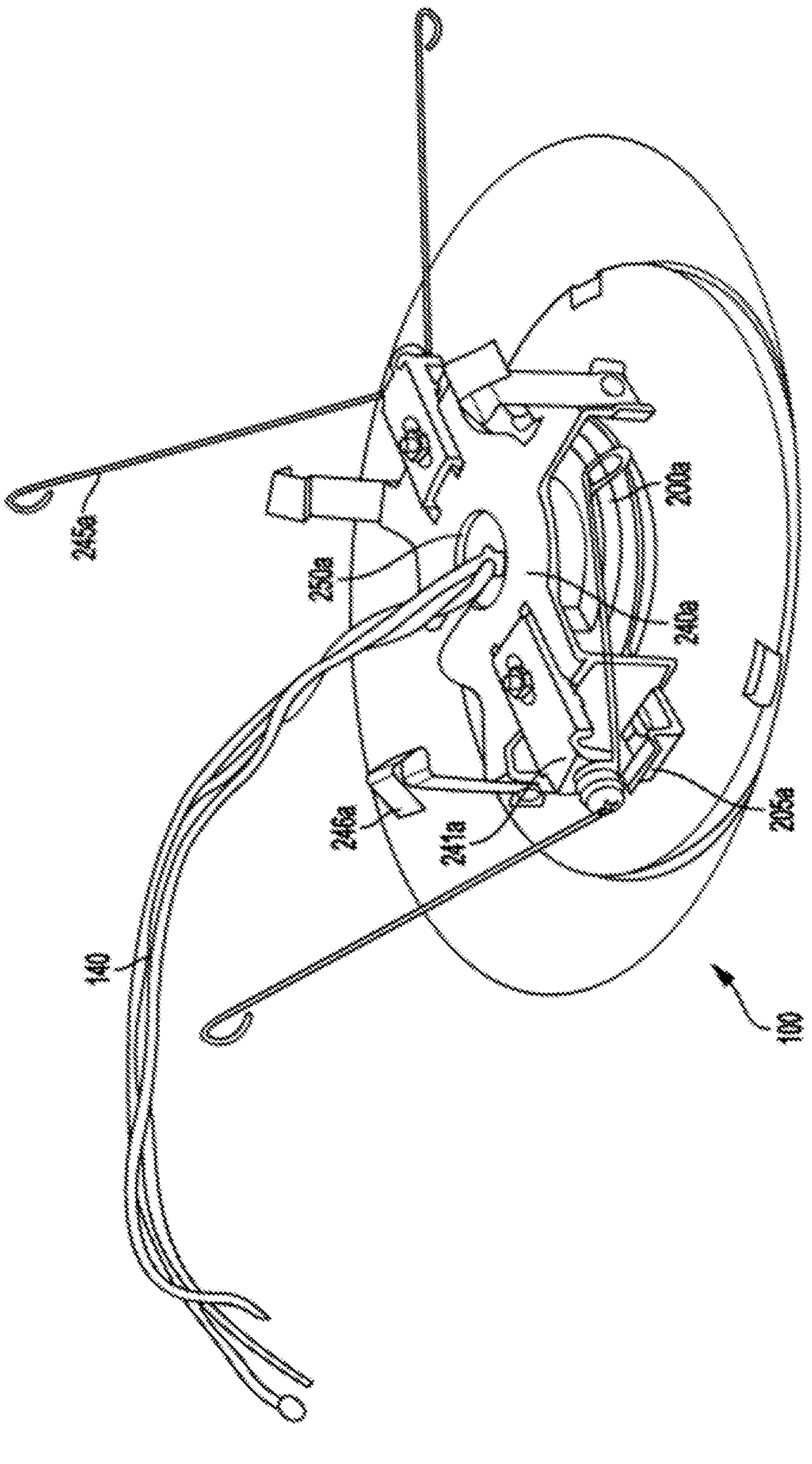
Figure 9:
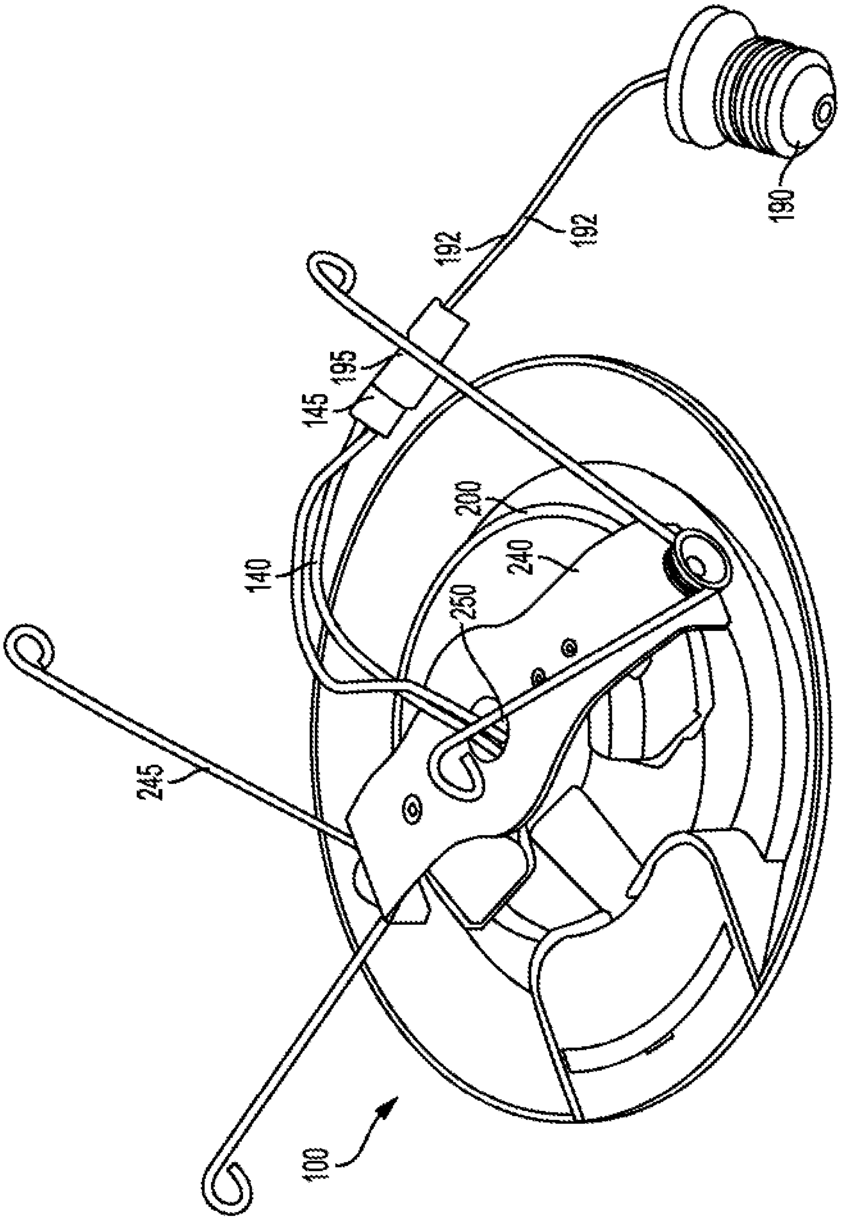
Figure 10:
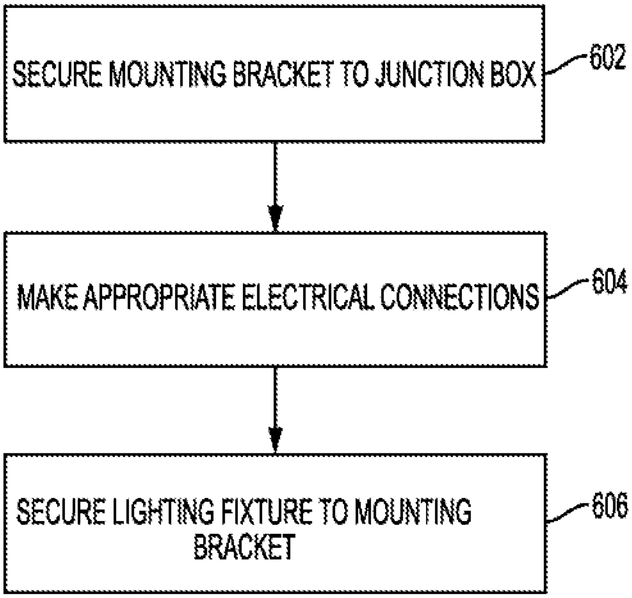
Figure 11:
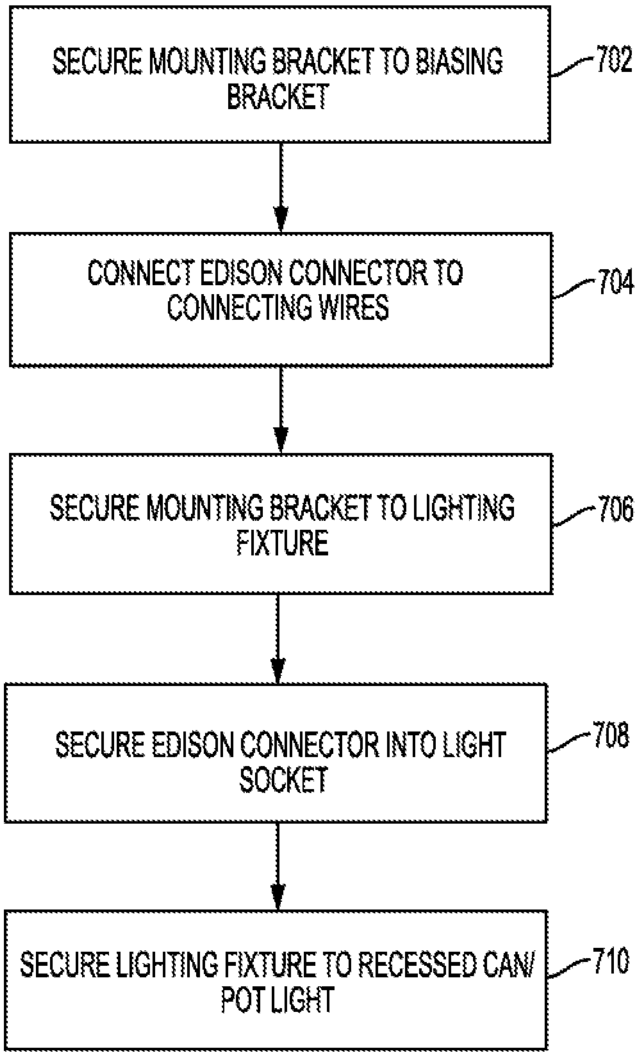

Having thus described various embodiments of the invention in general terms, reference will now be made to the accompanying drawings, which are not necessarily drawn to scale, and wherein:

FIG. 1 is a perspective view of a lighting fixture secured to a mounting bracket and in electrical communication with wires from a junction box, in accordance with an embodiment of the present invention;

FIG. 2 is a front view of a lighting fixture, in accordance with an embodiment of the present invention;

FIG. 3 is a back view of a lighting fixture, in accordance with an embodiment of the present invention;

FIGS. 4A-4B are perspective views of a mounting bracket and a junction box in accordance with an embodiment of the present invention;

FIGS. 5A-B are perspective views of a mounting bracket and biasing bracket in accordance with an embodiment of the present invention;

FIG. 6 is a perspective view of a mounting bracket and biasing bracket in accordance with another embodiment of the present invention;

FIG. 7 is a rear view of a mounting bracket, biasing bracket, and lighting fixture in accordance with an embodiment of the present invention;

FIG. 8 is a rear perspective view of a mounting bracket, biasing bracket, and lighting fixture in accordance with another embodiment of the present invention;

FIG. 9 is a rear perspective view of a mounting bracket, biasing bracket, and lighting fixture in accordance with another embodiment of the present invention; and FIGS. 10 and 11 provide flowcharts illustrating steps for mounting a lighting fixture according to various embodiments of the present invention.

DETAILED DESCRIPTION

Various embodiments of the present invention now will be described more fully hereinafter with reference to the accompanying drawings, in which some, but not all embodiments are shown. Indeed, the invention may be embodied in many different forms and should not be construed as limited to the various embodiments set forth herein; rather, the embodiments described herein are provided so that this disclosure will satisfy applicable legal requirements. Like numbers refer to like elements throughout.

I. Lighting Fixture 100

FIGS. 1-3 illustrate various views of a lighting fixture 100. In various embodiments, the lighting fixture may be a light emitting diode (LED) lighting fixture comprising at least one LED (e.g., one or more chip-on-board (COB) LEDs). As shown in FIGS. 1-3, the lighting fixture 100 may comprise a lens 110, a frame 120, one or more lighting elements, one or more circuit elements, a back cover 150, a twist and lock element 130, one or more connecting wires 140, and/or the like. In various embodiments, the lens 110, frame 120, and back cover 150 may be configured to enclose the at least one lighting element and/or one or more circuit elements in accordance with safety regulations (e.g., UL certification, and/or the like) as appropriate for the at least one lighting element and/or one more circuit elements. In various embodiments, the lens 110 and frame 120 may collectively define an emission side of the lighting fixture 100, and the back cover 150 may define a mounting side of the lighting fixture 100.

In various embodiments, the perimeter of the lighting fixture 100 (e.g., as defined by the edge of the frame 120) may be square, rectangular, circular, polygonal, or another shape. Moreover, the lighting fixture 100 may be hemispherical, domed, cubical, pyramid-shaped, and/or the like. As described in detail herein, the lighting fixture 100 may be configured to be secured to a mounting bracket 200 to be secured to a junction box 300. In various embodiments, the lighting fixture 100 may be configured to be secured to a mounting bracket 200 secured to a biasing bracket 240 to be mounted within a recessed can light.

A. Frame 120

In various embodiments, the frame 120 is configured to provide structural support to the lighting fixture 100. In various embodiments, the frame 120 may be configured to, with the lens 110, back cover 150, and/or other lighting fixture element, seal the electrical components (e.g., the at least one lighting element, one or more circuit elements, and/or the like) of the lighting fixture 100. For example, the frame 120 may be configured to, in cooperation with various other lighting fixture elements, define a sealed volume around the at least one lighting element and/or one or more circuit elements, and thereby prevent dust, dirt, and/or moisture from negatively affecting the at least one lighting element and/or the one or more circuit elements; prevent a user, consumer, installer, and/or the like from directly interacting with the at least one lighting element; and/or the like. In various embodiments, the frame 120 may be made of a plastic, metal, or other appropriate material.

B. Lens 110

The lens 110 may be configured such that at least a portion of the light emitted by the at least one lighting element (e.g., one or more LEDs, COB LED(s), and/or the like) can pass through the lens 110. For example, in various embodiments, the lens 110 may be configured such that at least 10% of the light emitted by the at least one lighting element can pass through the lens 110. In some embodiments, the lens 110 may be configured such that a significant fraction of the light emitted by the at least one lighting element can pass through the lens 110. For example, in certain various embodiments, the lens 110 may be configured to permit 10-30%, 30-50%, or 60-80% of the light emitted by the at least one lighting element and incident upon the lens 110 to pass through the lens 110. In some embodiments, the lens 110 may be configured to permit at least 50% of the light emitted by the at least one lighting element to pass through the lens 110. In certain embodiments, the lens 110 may be configured such that substantially all of the light emitted by the at least one lighting element and incident on the lens 110 may pass through the lens 110. For example, in some embodiments, the lens 110 may be configured to permit more than 80%, or in certain embodiments, more than 90%, of the light emitted by the at least one lighting element and incident upon the lens 110 to pass through lens 110.

In various embodiments, the lens 110 may comprise a polymerized material, as commonly known and understood in the art. In certain embodiments, the lens 110 may comprise plastic or acrylic. In various embodiments, the lens 110 may comprise a shatter and/or break resistant material in accordance with relevant safety standards. In some embodiments, the lens 110 may be made of an opaque material; however, in other embodiments, the lens 110 may be made of any of a variety of transparent, translucent, or semi-translucent materials, as may be commonly known and used in the art. Still further, according to other embodiments, the lens 110 may be clear or frosted. In at least one embodiment, the lens 110 may be made of Smart Glass, or some other material that can transition from clear to frosted and/or vice versa. In yet other embodiments, the lens 110 may be tinted with one or more colors. For example, in at least one embodiment, the lens 110 may be tinted blue to give the light emitted by the lamp a blue glow. Indeed, it should be understood that the lens 110 may be made from any of a variety of materials, as may be commonly known and used and readily available in the art, provided such possess the light transmission characteristics that are desirable for particular applications.

In various embodiments, the transparent, translucent, or semi-translucent material may permit passage of at least some portion of the light emitted by the at least one lighting element and incident upon the lens 110 to pass through the lens 110. In certain embodiments, the translucent or semi-translucent material may allow passage of at least 10% of the light emitted by the at least one lighting element to pass through the lens 110. In at least one embodiment, the transparent, translucent, or semi-translucent material may permit passage of 10-30% of the light emitted by the at least one lighting element and incident upon the cover to pass through the lens 110. In other certain embodiments, the translucent or semi-translucent material may be configured to permit passage of 30-50% of the light emitted by the at least one lighting element to pass through the lens 110. In still other embodiments the translucent or semi-translucent material may permit passage of more than 50%, or, in certain various embodiments, more than 80%, of the light emitted by the at least one lighting element to pass through lens 110. Alternatively, the translucent or semi-translucent material may permit passage of 60-80% of the light emitted by at least one lighting element to pass through the lens 110. Indeed, it should be understood that according to various embodiments, the lens 110 may be configured to permit at least some desired portion of the light emitted by the at least one lighting element and incident upon the lens 110 to pass through the lens 110, however as may be beneficial for particular applications.

C. Lighting Element and Circuit Element

The lighting fixture 100 may also comprise at least one lighting element, as commonly known in the art. In various embodiments, the at least one lighting element may be at least one LED, at least one COB LED, and/or the like. In embodiments having more than one lighting element, the lighting elements may have different wattages and/or different color temperatures. In various embodiments, the one or more lighting elements may be secured within the lighting fixture 100 such that the light emitted by the one or more lighting elements is emitted toward the lens 110. Also, various embodiments of the lighting fixture 100 may comprise lighting elements that emit different levels of illumination at different color temperatures. The number of lighting elements used may also be utilized to determine the level of illumination emitted by the lighting fixture 100.

One or more circuit elements are disposed within the lighting fixture 100. In various embodiments, the circuit elements may be configured to provide an electrical current to the at least one lighting element. For example, in the case of the at least one lighting element being an LED or COB LED, the at least one circuit element may be driver circuitry. In such embodiments, the driver circuitry may comprise a circuit portion configured to convert an input alternating current (AC) line voltage to a direct current (DC) voltage. In various embodiments, the driver circuitry may comprise a circuit portion configured to control the current being applied to the one or more LEDs. The driver circuitry, in various embodiments, may further comprise a circuit portion configured to allow a user to adjust the brightness of the light emitted from the lighting fixture 100 through the use of a dimmer switch. These circuitry portions are commonly known and understood in the art, and thus will not be described in detail herein. In various embodiments, the driver circuitry may include other circuitry portions and/or the circuitry portions described herein may not be distinct circuitry portions. For example, in some embodiments, the circuitry portion that converts an AC line voltage to a DC voltage may also control the current being applied to the one or more LEDs.

In various embodiments, the one or more circuit elements may be disposed within a chamber accessible via the circuit access door 155. In other embodiments, the one or more circuit elements are sealed within the lighting fixture 100 such that a user cannot easily and/or inadvertently come into contact with the one or more circuit elements, in accordance with relevant safety guidelines (e.g., UL certification, etc.).

D. Back Cover 150

As shown in FIG. 3, the lighting fixture 100 may comprise a back cover 150. The back cover 150 may be configured to seal the interior of the lighting fixture 100 from dust, dirt, moisture and/or the like; enclose the electrical components (e.g., the at least one lighting element and/or the one or more circuit elements) of the lighting fixture 100; provide structural support for the lighting fixture 100; prevent a user from coming into contact with the electrical components of the lighting fixture 100; and/or the like. In some embodiments, one or more connecting wires 140 in electrical communication with the at least one lighting element and/or the circuit components may be configured to provide electrical communication between the at least one lighting element and/or the circuit components and an input (e.g., line voltage). In various embodiments, a first end of the one or more connecting wires 140 may be secured to the electrical components of the lighting fixture (e.g., the at least one lighting element and/or the circuit components), and a second end of the connecting wires 140 may be secured in a halo, WAGO, quick connect, or other connector. In various embodiments, the second end of the connecting wires may be configured to be secured to an input (e.g., a line voltage wire) via a wire nut and/or the like.

In various embodiments, the lighting fixture 100 may be configured to be detachably secured to a mounting bracket 200. Accordingly, the back cover 150 may comprise a twist and lock element 130. As described herein, the twist and lock element 130 may be configured to detachably couple the lighting fixture 100 to a mounting bracket 200 having a twist and lock receiver 230. For example, the twist and lock element 130 may have one or more tabs 135 configured to engage a twist and lock tab receiver 235. As will be described in greater detail herein, the mounting bracket 200 may comprise a thin, rigid plate defining an aperture sized such that at least a portion of the twist and lock element 130 may extend through the aperture, and the entirety of the tabs 135 may pass through the aperture, such that the twist and lock element 130 and the tabs 135 may rotate without colliding with the rigid plate. In various embodiments, the aperture has a shape corresponding to the shape of the twist and lock element 130 and the one or more tabs 135, such that the twist and lock element 130 may extend through the aperture only when the tabs 135 are aligned with aperture features corresponding to the tabs 135. As a non-limiting example, the twist and lock element 130 may have a substantially round, tube shape central body element extending away from the lighting fixture 100. The twist and lock element 130 may have one or more tabs 135 extending laterally away from the curved sides of the central body element. The twist and lock receiver may thus have a substantially round shape (e.g., circular) having a diameter larger than the central body element, with one or more tab receivers 235, having a shape corresponding to the one or more tabs 135. Accordingly, the profile of the twist and lock receiver 230 corresponds to the shape of the twist and lock element 130. With at least a portion of the twist and lock element 130 extending through the aperture such that the tabs may rotate without colliding with the rigid plate, the lighting fixture 100 may be rotated with respect to the mounting bracket 200 until the tabs 135 are not aligned with the corresponding aperture features, and the rigid plate of the mounting bracket 200 prevents the twist and lock element 130 and tabs 135 from disengaging the mounting bracket 200. In various embodiments, the tabs 135 and twist and lock element 130 may be configured to frictionally engage the mounting bracket 200 such that the frictional force between the tabs 135 and the mounting bracket 200 impedes rotation of the lighting fixture 100 relative to the mounting bracket.

II. Mounting Bracket 200

FIGS. 4A-9 illustrate various embodiments of mounting brackets. Specifically, FIGS. 4A-4B illustrate a mounting bracket 200*a* according to one embodiment. In the illustrated embodiment of FIG. 4A, the mounting bracket 200*a* is configured to secure the lighting fixture 100 to a junction box 300. For example, the illustrated mounting bracket 200*a* comprises a twist and lock receiver 230*a* having twist and lock tab receivers 235*a* associated therewith for receiving tabs 135. In various embodiments, the twist and lock receiver 230*a* may comprise a twist and lock tab receiver 235*a* for each tab 135. The twist and lock tab receiver 235*a* may be configured such that each twist and lock tab receiver 235*a* may receive a tab 135; the mounting bracket 200*a* and the lighting fixture 100 may then be rotated with respect to each other such that each tab 135 is secured to the mounting bracket 200*a* via the twist and lock receiver 230*a*. In various embodiments, the twist and lock element 130 and twist and lock receiver 230*a* may be configured to secure the mounting bracket relative to the lighting fixture 100.

The mounting bracket 200*a* may also include attachment elements 210*a*, 215*a*. The attachment elements 210*a*, 215*a* may be configured to secure the mounting bracket 200*a* to a junction box 300 (as shown in FIG. 4B) and/or biasing bracket 240. For example, screws may be used to secure the mounting bracket 200*a* to a junction box 300 (e.g., via attachment elements 215*a*, 310) or screws may be used to secure the mounting bracket 200 to a biasing bracket 240. In various embodiments, the attachment elements 210*a*, 215*a* may be configured to secure the mounting bracket 200*a* to a variety of sized and/or shaped junction boxes (e.g., 3 inch diameter junction boxes, 4 inch diameter junction boxes, round junction boxes, square junction boxes, octagonal junction boxes, and/or the like). As a non-limiting example, attachment elements 210*a* may be configured to secure the mounting bracket 200*a* to a first size junction box 300 (e.g., a 3 inch diameter junction box) via a fastener (e.g., a screw) and attachment elements 215*a* may be configured to secure the mounting bracket 200*a* to a second size junction box 300 (e.g., a 4 inch diameter junction box) via a fastener. In other embodiments, a variety of methods may be used to secure a mounting bracket 200*a* to a biasing bracket 240 and/or a junction box 300.

Moreover, in the illustrated embodiment of FIG. 4A, the mounting bracket 200*a* additionally comprises one or more standoffs 205 configured to maintain a minimum distance between a mounting surface (e.g., a ceiling) and the mounting bracket 200*a*. As shown in FIG. 4B, the one or more standoffs 205 may be configured to engage the mounting surface outside of the diameter of the junction box 300. Moreover, the one or more standoffs 205 may accommodate a junction box 300 protruding from the mounting surface, as shown in FIG. 4B. The one or more standoffs 205 may engage the mounting surface to thereby impede the mounting bracket 200*a* from being secured to the junction box 300 such that a bottom surface of the mounting bracket 200*a* is in contact with a top surface of the junction box 300 when the junction box 300 protrudes from the mounting surface by a distance less than the length of the one or more standoffs 205. As a non-limiting example, the lighting fixture 100 may be configured such that the outer edge of the frame 110 may engage the mounting surface when the lighting fixture 100 is engaged with a mounting bracket 200*a* positioned at the minimum distance away from the mounting surface. Thus, the one or more standoffs 205 may be configured to position the mounting bracket 200*a* relative to the mounting surface such that the outer edge of the frame 110 of the lighting fixture 100 engages the mounting surface when secured to the mounting bracket 200*a*.

FIGS. 5A-5B illustrate a mounting bracket 200*a* secured to a biasing bracket 240*a* according to one embodiment. As shown in FIG. 5A, the mounting bracket 200*a* may be secured to the biasing bracket 240*a* utilizing one or more fasteners (e.g., screws) extending through one or more of the attachment elements 210*a*, 215*a* and one or more corresponding attachment elements of the biasing bracket 240*a*. In such a configuration, the mounting bracket 200*a* and biasing bracket 240*a* may be collectively configured to secure the lighting fixture 100 to a recessed can lighting fixture.

FIG. 6 illustrates a mounting bracket 200 in accordance with another embodiment. The mounting bracket 200 may be configured to be secured to the lighting fixture 100. For example, the illustrated mounting bracket 200 comprises a twist and lock receiver 230 having twist and lock tab receivers 235 associated therewith for receiving tabs 135. In various embodiments, the twist and lock receiver 230 may comprise a twist and lock tab receiver 235 for each tab 135. The twist and lock tab receiver 235 may be configured such that each twist and lock tab receiver 235 may receive a tab 135; the mounting bracket 200 and the lighting fixture 100 may then be rotated with respect to each other such that each tab 135 is secured to the mounting bracket 200 via the twist and lock receiver 230. In various embodiments, the twist and lock element 130 and twist and lock receiver 230 may be configured to secure the mounting bracket relative to the lighting fixture 100. As shown in FIG. 6, the mounting bracket 200 may be approximately half an annulus, and/or the like.

As shown in FIG. 6, the mounting bracket 200 may also include attachment elements 210, 215. The attachment elements 210, 215 may be configured to secure the mounting bracket 200 to a junction box 300 and/or biasing bracket 240 (as shown in FIG. 6). For example, screws may be used to secure the mounting bracket 200 to a junction box 300 (e.g., via attachment elements 215, 310) or screws may be used to secure the mounting bracket 200 to a biasing bracket 240. In other embodiments, a variety of methods may be used to secure a mounting bracket 200 to a biasing bracket 240 and/or a junction box 300.

In various embodiments, the mounting bracket may be made of aluminum, plastic, and/or other appropriate material.

III. Biasing Bracket 240

As previously indicated, FIGS. 5A-5B illustrate a biasing bracket 240*a* secured to a mounting bracket 200*a* according to an embodiment. In various embodiments, the biasing bracket 240*a* may comprise one or more first resilient members 245*a* as shown in FIG. 5A secured to corresponding width adjusting members 241*a*, one or more second resilient members 246*a*, and a wire conduit 250*a*. The wire conduit 250*a* may comprise an aperture, slot, and/or the like defined and extending through the biasing bracket 240*a*. The wire conduit 250*a* may be configured to receive the connecting wires 140 of the lighting fixture 100, such that the lighting fixture 100 may be secured in electrical connection with an input (e.g., line voltage).

In various embodiments, the one or more first resilient members 245*a* and one or more second resilient members 246*a* may be configured to frictionally engage the interior of a recessed can light and thereby frictionally secure the biasing bracket 240*a*, the mounting bracket 200, and the lighting fixture 100 to the can light. In various embodiments, the first resilient members 245*a* may comprise a resilient material (e.g., metal rods) biased to an extended position as shown in FIG. 5A. Accordingly, when placed within the interior of a can light, the first resilient members 245*a* bias against the interior surface of the can light and thereby frictionally engage the interior surface of the can light. In various embodiments, the first resilient members 245*a* may engage one or more receiving features of the can light (e.g., apertures, clips, and/or the like) configured to engage the first resilient features 245*a* to further impede the lighting fixture 100 from disengaging the can light. Similarly, the second resilient members 246*a* may comprise a resilient material (e.g., metal) biased to an extended position, such that when placed within the interior of a can light, the second resilient members 246*a* bias against the interior surface of the can light and thereby frictionally engage the interior surface of the can light.

As illustrated in FIG. 5A, the biasing bracket 240*a* may comprise one or more width adjustment members 241*a*. The width adjustment members 241*a* may be slidably coupled to the biasing bracket 240*a*, and configured such that the first resilient members 245*a* may be moved between two or more positions, such as a narrow position at which the first resilient members are near a center portion of the lighting fixture 100, and a wide position at which the first resilient members are positioned some distance away from the center portion of the lighting fixture. Moreover, as illustrated in FIG. 5A, the width adjustment features 241*a* may be locked into a particular position using a fastener 242*a* (e.g., a bolt). As a non-limiting example, after the width adjustment features 241*a* are positioned in a desired position, the fastener 242*a* may be tightened to secure the width adjustment features into position.

As a non-limiting example, the width adjusting members 241*a* may be configurable between the narrow position configured to engage a first diameter can light and the wide position configured to engage a second diameter can light. Moreover, in various embodiments, the width adjusting members 241*a* and corresponding first resilient members 245*a* may be removable as shown in FIG. 5B, such that the one or more second resilient members 246*a* may engage a third diameter can light that is smaller than the first and second diameter can lights. As a non-limiting example, the lighting fixture 100 may be secured to a 4-inch diameter can light utilizing the one or more second resilient members 246*a* when the width adjusting members 241*a* are removed, the lighting fixture 100 may be secured to a 5-inch diameter can light utilizing the one or more first resilient members 245*a* when the width adjusting members 241*a* are in the narrow configuration, and the lighting fixture 100 may be secured to a 6-inch diameter can light utilizing the one or more first resilient members 245*a* when the width adjusting members 241*a* are in the wide configuration.

As shown in FIG. 7, when the biasing bracket 240*a* and the mounting bracket 200*a* are secured to the lighting fixture 100, the components of each of the biasing bracket 240*a* and mounting bracket 200*a* may be entirely within the perimeter of the lighting fixture frame 120, such that, when installed against a mounting surface, the biasing bracket 240*a* and the mounting bracket 200*a* are not visible.

FIG. 8 illustrates a rear view of a biasing bracket 240*a* and mounting bracket 200*a* secured to a lighting fixture 100. As shown in FIG. 8, the wire conduit 250*a* of the biasing bracket 240*a* may comprise a slot so as to facilitate the placement of the one or more connecting wires 140 within the wire conduit 250*a*. Moreover, as shown in FIG. 8, the biasing bracket 240*a* may be secured to mounting bracket 200*a*. In such configurations, the mounting bracket 200*a* may be configured to mount within a can light such that an edge of the mounting bracket 200*a* is flush with an edge of the can light.

FIG. 9 illustrates a biasing bracket 240 secured to a mounting bracket 200 according to another embodiment. As illustrated in FIG. 9, the biasing bracket 240 may comprise one or more first resilient members 245 and a wire conduit 250. The wire conduit 250 may be configured to receive the connecting wires 140 or the like there-through, such that the lighting fixture 100 may be secured in electrical connection with an input (e.g., a line voltage). The one or more first resilient members 245 may be configured such that the one or more first resilient members 245, biasing bracket 240, and/or mounting bracket 200 may be placed within a recessed can light. The first resilient members 245 may bias against the interior walls of the recessed can light, thereby frictionally securing the lighting fixture 100 into the recessed can light. In various embodiments, the biasing bracket 240 may be made of plastic, aluminum, or other appropriate material. In some embodiments the first resilient members 245 may be made of the same or different material as the biasing bracket 240. In other embodiments, the first resilient members 245 may be otherwise biased, as may be desirable so as to secure the same relative to a recessed can light or other fixture receptacle.

As shown at least in FIG. 9, in embodiments wherein the lighting fixture 100 is to be installed into a recessed can light, an Edison connector 190 may be secured to the connecting wires 140 (e.g., via the Edison connector wires 192 and halo/WAGO/quick connect connector 195 and/or wire nuts). The Edison connector may be screwed or otherwise secured into the existing can light bulb receptacle, such that the lighting fixture 100 may be secured into electric communication with the input (e.g., line voltage).

It should be understood that some embodiments may not include a biasing bracket 240. For example, as shown in FIG. 1, the lighting fixture 100 may be installed using a mounting bracket 200 without a biasing bracket 240. In embodiments wherein the lighting fixture 100 is to be flush mounted to a junction box 300, it may be undesirable to use a biasing bracket 240. As should be understood, the halo/WAGO/quick connect connector 145 and/or Edison connector may be used in applications regardless of whether or not the embodiment includes a biasing bracket 240 or not.

IV. Exemplary Methods of Installing a Lighting Fixture 100

FIG. 10 provides a flowchart of various processes and operations that may be completed to install a lighting fixture 100 by mounting the lighting fixture to junction box 300. In various embodiments, it may be necessary to cut an appropriately sized hole in a wall, ceiling, and/or the like (e.g., in the drywall, etc. to access the junction box). At step 602, the mounting bracket 200 may be secured to the junction box 300. For example, screws may be used to secure the mounting bracket 200 to the junction box 300 via the attachment elements 210, 310. At step 604, the appropriate electrical connections may be made. For example, the connecting wires 140 may be connected to input (e.g., line voltage) wires 340 via wire nuts 345, a quick connect connector, and/or the like. At step 606, the lighting fixture 100 may be secured to the mounting bracket. For example, the twist and lock element 130 may be received by the twist and lock receiver 230 (e.g., the tabs 135 may be placed within the twist and lock tab receivers 235). The lighting fixture 100 may then be rotated with respect to the mounting bracket 200 to secure the lighting fixture to the mounting bracket 200.

FIG. 11 provides a flowchart of various processes and operations that may be completed to install a lighting fixture 100 by mounting the lighting fixture into a recessed can or can light. At step 702, the mounting bracket 200 is secured to the biasing bracket 240 (e.g., via screws and/or the like). In other embodiments, the mounting bracket 200 and the biasing bracket 240 may be integrally formed, and thus step 702 may be completed during the manufacturing process.

At step 704, the Edison connector 190 is connected to the lighting fixture 100 via the connecting wires 140, Edison connector wires 192, quick connect connectors 145, 195, wire nuts, and/or the like. The Edison connector 190 may be connected to the lighting fixture 100 such that the connecting wires 140 and/or the Edison connector wires 192 pass through the wire conduit 250 and/or through the twist and lock receiver 230 opening in the mounting bracket 200, as shown in FIGS. 7-8. At step 706, the mounting bracket 200 may be secured to the lighting fixture 100. For example, the twist and lock element 130 may be received by the twist and lock receiver 230 (e.g., the tabs 135 may be placed within the twist and lock tab receivers 235). The lighting fixture 100 may then be rotated with respect to the mounting bracket 200 to secure the lighting fixture to the mounting bracket 200.

At step 708, the Edison connector 190 may be secured into the socket of the recessed can light. For example, the Edison connector 190 may be rotated with respect to the socket of the recessed can light such that the Edison connector 190 provides electrical communication between the lighting fixture 100 and line voltage, and/or the like. At step 710, the lighting fixture is secured to the recessed can light. For example, the first resilient members 245 may be pinched together and inserted into the recessed can light. The first resilient members 245 may then bias against and/or grip the interior walls of the recessed can light and/or the receiving features of the can light, holding the lighting fixture 100 to the recessed can light.

The installation methods illustrated in FIGS. 10 and 11 provide non-limiting examples of how the mounting bracket 200 and/or the biasing bracket 240 may be used to install a lighting fixture 100. For example, the mounting bracket 200 may be used to secure a lighting fixture 100 to a junction box. In another example, a mounting bracket 200 and a biasing bracket 240 may be used to secure a lighting fixture 100 to a recessed can light. A variety of other methods of installing a lighting fixture via a mounting bracket 200 may be envisioned as within the scope and spirit of the present inventive concept.

V. Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of installing a lighting fixture, said method comprising the steps of:
securing a mounting bracket to a junction box; and
securing the lighting fixture to the mounting bracket, wherein the mounting bracket comprises:
a receiver element comprising:
(i) a first portion lying in a first plane, the first portion having an opening and at least two notches located on opposite sides of the opening; and
(ii) a second portion extending radially outwardly from the first portion at an offset angle, lying in a second plane intersecting the first plane, and positioned such that an entirety of the first portion lies radially within the second portion; and
a standoff portion lying in a third plane different from both the first and second planes, the standoff portion being positioned such that the second portion is intermediate the first portion and the standoff portion.

2. The method of claim 1, wherein, for the securing of the lighting fixture to the mounting bracket, at least one of the at least two notches is aligned around the opening such that the one of the at least two notches is intermediate the opening and the standoff portion.

3. The method of claim 1, wherein the standoff portion comprises at least two standoff portions and wherein, for the securing of the lighting fixture to the mounting bracket, the at least two notches are aligned around the opening such that the at least two notches are each intermediate the opening and the at least two standoff portions.

4. The method of claim 1, further comprising, prior to the securing of the lighting fixture to the mounting bracket, the step of making one or more electrical connections.

5. The method of claim 4, wherein the one or more electrical connections comprise one or more connections between connecting wires of the lighting fixture and an input line voltage.

6. The method of claim 5, wherein the one or more connections are made via either a wire nut or a quick connect connector.

7. The method of claim 1, wherein:
the standoff portion includes a first attachment element and a second attachment element;
the first attachment element is rectangular-shaped; and
the second attachment element is L-shaped and extends, in part, adjacent the first attachment element and, in part, in the third plane.

8. The method of claim 1, wherein the securing of the lighting fixture to the mounting bracket comprises rotating the lighting fixture relative to the mounting bracket.

9. The method of claim 8, wherein the rotating involves engagement of the receiver element with corresponding portions of the lighting fixture.

10. The method of claim 9, wherein the corresponding portions of the lighting fixture comprise a twist and lock element.

11. A method of installing a lighting fixture, the method comprising the steps of:

securing a mounting bracket to a bias; and securing the lighting fixture to the mounting bracket, wherein:

the mounting bracket comprises:

a first portion lying in a first plane, the first portion having an opening and at least two notches located on opposite sides of the opening;

a second portion extending radially outwardly from the first portion, lying in a second plane intersecting the first plane at an offset angle, and positioned such that an entirety of the first portion lies radially within the second portion; and at least one standoff having a standoff portion lying in a third plane different from to the first and second planes; and the at least one standoff is positioned such that the second portion is intermediate the first portion and the at least one standoff.

12. The method of claim 11, wherein the at least one standoff comprises at least two standoffs, and wherein, for the securing of the lighting fixture to the mounting bracket, the at least two notches are aligned around the opening such that the one of the at least two notches is intermediate the opening and at least one of the at least two standoffs.

13. The method of claim 11, further comprising, prior to the securing of the lighting fixture to the mounting bracket, the step of making one or more electrical connections.

14. The method of claim 13, wherein the one or more electrical connections comprise one or more connections between connecting wires of the lighting fixture and an input line voltage.

15. The method of claim 14, wherein the one or more connections are made via either a wire nut or a quick connect connector.

16. The method of claim 11, wherein the securing of the lighting fixture to the mounting bracket comprises rotating the lighting fixture relative to the mounting bracket.

17. The method of claim 16, wherein the rotating involves engagement of a receiver element with corresponding portions of the lighting fixture.

18. The method of claim 17, wherein the corresponding portions of the lighting fixture comprise a twist and lock element.

19. A method of installing a lighting fixture, the method comprising the steps of:

securing a bracket to a junction box; and securing the lighting fixture to the bracket, the bracket comprising: a first portion lying in a first plane and having an opening and at least two notches located on opposite sides of the opening, a second portion extending from the first portion, lying in a second plane intersecting the first plane at an offset angle, and positioned such that an entirety of the first portion lies radially within the second portion, and at least one standoff having a standoff portion lying in a third plane different from the first and second planes, wherein the at least one standoff has a first attachment element perpendicular the standoff portion and a hole located on the first attachment element configured for receiving a fastener to accommodate attachment of the junction box to the mounting bracket.

* * * * *